(12) United States Patent
Wigren et al.

(10) Patent No.: US 12,096,381 B2
(45) Date of Patent: Sep. 17, 2024

(54) AVERAGE EIRP REGULATION INTERVAL ENHANCEMENT BY TIME BLANKED SCHEDULING

(71) Applicant: TELEFONAKTIEBOLAGET LM ERICSSON (PUBL), Stockholm (SE)

(72) Inventors: Torbjörn Wigren, Uppsala (SE); Shiguang Guo, Kanata (CA); Ken Huisman, Stittsville (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 6 days.

(21) Appl. No.: 17/641,981

(22) PCT Filed: Oct. 7, 2019

(86) PCT No.: PCT/IB2019/058532
§ 371 (c)(1),
(2) Date: Mar. 10, 2022

(87) PCT Pub. No.: WO2021/069953
PCT Pub. Date: Apr. 15, 2021

(65) Prior Publication Data
US 2024/0049149 A1 Feb. 8, 2024

(51) Int. Cl.
*H04W 52/14* (2009.01)
*H04W 52/36* (2009.01)
(Continued)

(52) U.S. Cl.
CPC ....... *H04W 52/367* (2013.01); *H04W 52/143* (2013.01); *H04W 72/0446* (2013.01); *H04W 72/1273* (2013.01)

(58) Field of Classification Search
CPC ............... H04W 52/367; H04W 52/14; H04W 52/143; H04W 72/0446; H04W 72/1273
See application file for complete search history.

(56) References Cited

U.S. PATENT DOCUMENTS 8,537,948 B2 * 9/2013 Przada ................ H04J 3/0688
375/365
8,811,213 B1 8/2014 Rai
(Continued)

FOREIGN PATENT DOCUMENTS

CN 104541545 A 4/2015
EP 3518587 A1 7/2019
(Continued)

OTHER PUBLICATIONS

Ericsson, Offline Discussion on DL Control Channels for NR, 3GPP TSG-RAN WG1 #88, R1-1704124, 3 pages, Feb. 13- 17, 2017, Athens, Greece.
(Continued)

*Primary Examiner* — Hai V Nguyen
(74) *Attorney, Agent, or Firm* — Ericsson Inc.

(57) ABSTRACT

Embodiments of a method in a network node for controlling a radio transmitter. In each one of a plurality of consecutive control steps spanning a predetermined control window, determining a first limit representing a number of physical resource blocks, PRBs, that can be scheduled in each one of a plurality of consecutive future slots of a current control step, based at least in part on an allowable average output power of the radio transmitter. The control window comprises a plurality of control steps, and each control step comprises a plurality of slots. When the determined first limit is less than or equal to a pre-configured second limit representing a number of PRBs that can be scheduled in a single slot, scheduling PRBs in a proportion of the plurality of consecutive future slots of the current control step, the proportion being calculated such that an averaged fraction of scheduled PRBs in the current control step is less than or equal to the first limit.

13 Claims, 10 Drawing Sheets

(51) Int. Cl.
*H04W 72/0446* (2023.01)
*H04W 72/1273* (2023.01)

(56) References Cited

U.S. PATENT DOCUMENTS

| | | | | |
|---|---|---|---|---|
| 10,797,740 | B2* | 10/2020 | Abdelmonem | H04W 28/04 |
| 10,892,789 | B2* | 1/2021 | Abdelmonem | H04W 72/044 |
| 11,382,110 | B2* | 7/2022 | Bidkar | H04W 28/02 |
| 11,456,766 | B2* | 9/2022 | Abdelmonem | H04W 72/0453 |
| 11,483,204 | B2* | 10/2022 | Lin | H04L 41/0866 |
| 2013/0107998 | A1* | 5/2013 | Przada | H04J 3/0688 |
| | | | | 375/362 |
| 2015/0223216 | A1* | 8/2015 | Han | H04W 72/044 |
| | | | | 370/329 |
| 2017/0064641 | A1 | 3/2017 | Logan | |
| 2019/0149365 | A1* | 5/2019 | Chatterjee | H04L 25/0226 |
| | | | | 370/329 |
| 2019/0150118 | A1* | 5/2019 | Nam | H04L 1/0071 |
| | | | | 370/329 |
| 2019/0191453 | A1* | 6/2019 | Xiong | H04L 5/0055 |
| 2020/0163108 | A1* | 5/2020 | Lin | H04L 5/0053 |
| 2020/0177317 | A1* | 6/2020 | Xing | H04L 1/1887 |
| 2020/0177346 | A1* | 6/2020 | Xing | H04L 1/1854 |
| 2020/0177347 | A1* | 6/2020 | Xing | H04W 72/0446 |
| 2020/0213907 | A1* | 7/2020 | Shlomo | H04L 47/83 |
| 2020/0236700 | A1* | 7/2020 | Matsumura | H04L 5/0007 |
| 2020/0244530 | A1* | 7/2020 | Lin | H04W 72/23 |
| 2021/0136790 | A1* | 5/2021 | Bidkar | H04W 88/085 |
| 2021/0266828 | A1* | 8/2021 | Hwang | H04L 5/0092 |
| 2022/0030525 | A1* | 1/2022 | Chincholi | H04W 52/367 |
| 2022/0159674 | A1* | 5/2022 | Deng | H04W 72/566 |
| 2023/0254017 | A1* | 8/2023 | Wigren | H04W 52/245 |
| | | | | 375/262 |
| 2023/0354210 | A1* | 11/2023 | Guo | H04W 52/367 |

FOREIGN PATENT DOCUMENTS

| | | |
|---|---|---|
| WO | 2013169151 A1 | 11/2013 |
| WO | 2016034244 A1 | 3/2016 |

OTHER PUBLICATIONS

NTT DoCoMo, Inc., UL control channel structure in short duration, 3GPP TSG RAN WG1 AH_NR Meeting, R1-1700622, Jan. 16-20, 2017, 69 pages, Spokane, USA.

Chinese Office Action and English language Summary translation of the Chinese Office Action dated Jan. 10, 2024 issued in corresponding Chinese Application No. 201980101136.2 consisting of 6 pages.

* cited by examiner

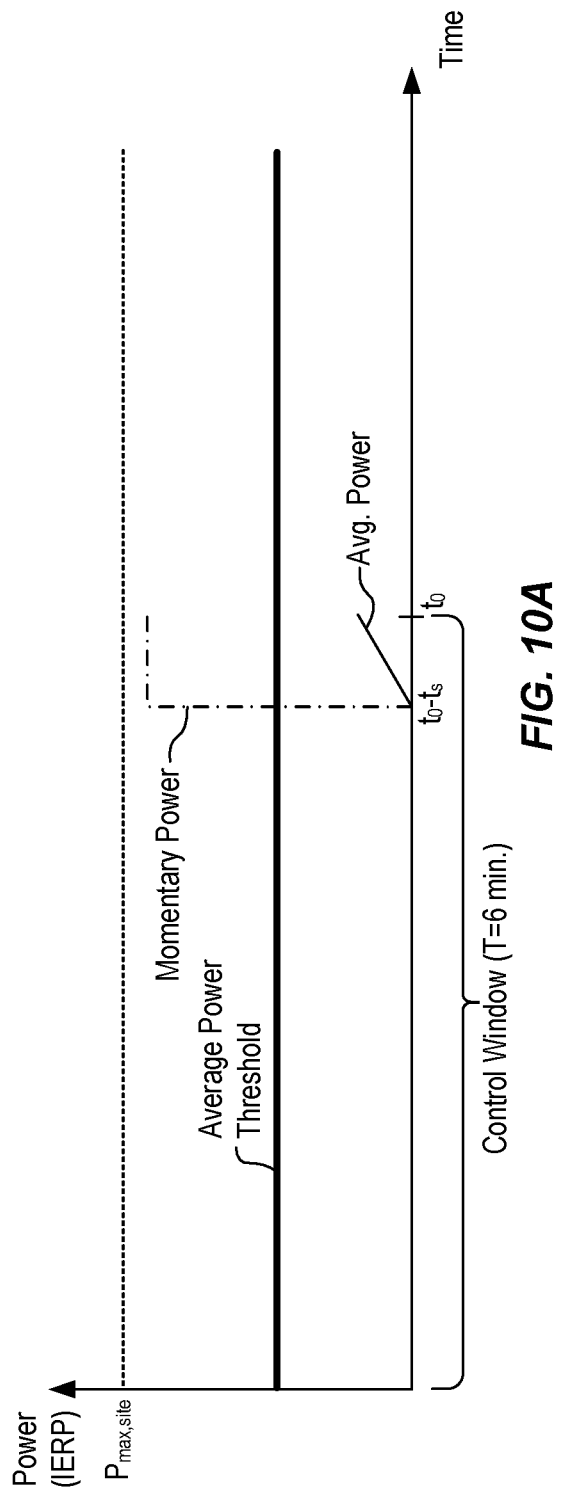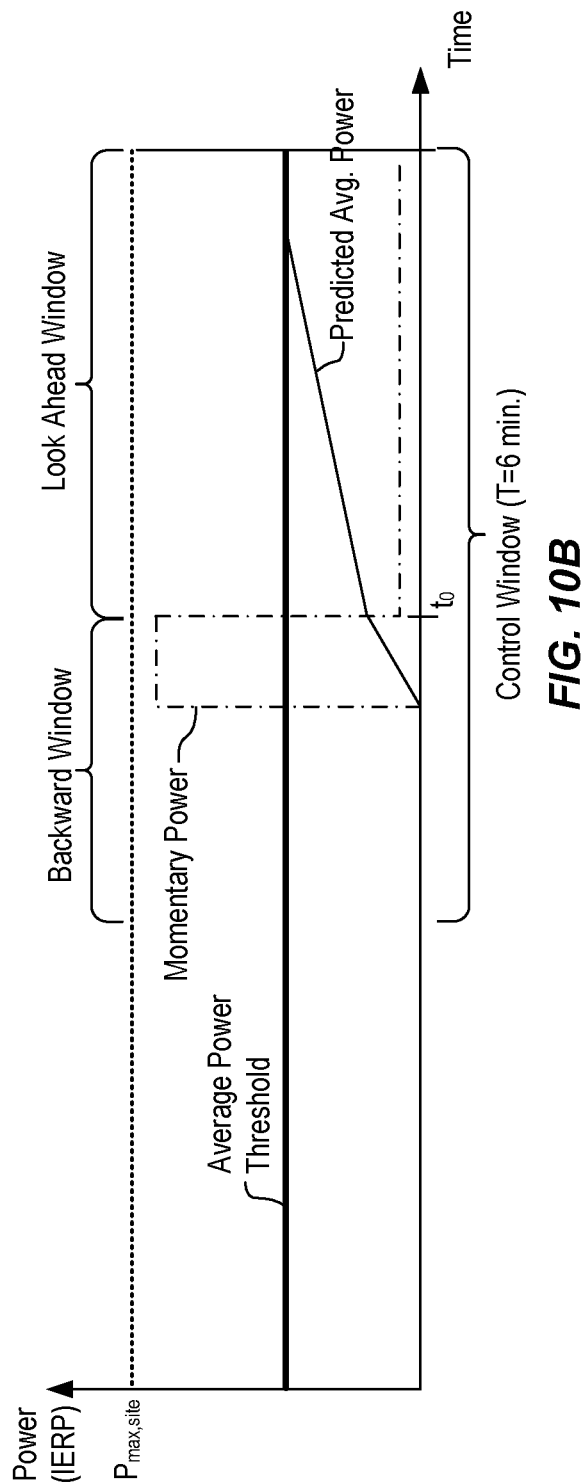
FIG. 10A
FIG. 10B

AVERAGE EIRP REGULATION INTERVAL ENHANCEMENT BY TIME BLANKED SCHEDULING

TECHNICAL FIELD

The present disclosure relates to wireless communication, and particularly relate to methods, apparatus and computer programs for controlling the output of a transmission point.

Background

When any radio equipment is to be deployed, regulatory radio frequency (RF) exposure regulations need to be accounted for. These exposure limitations are typically based on the guidelines from the International Commission on Non-Ionizing Radiation Protection (ICNIRP) but may take different forms in different countries and regions. The aim of the RF exposure regulations is to ensure that human exposure to RF energy is kept within safe limits, which have typically been set with wide safety margins.

Transmission points for wireless communication networks are increasingly being equipped with advanced antenna systems (AAS). These antenna systems increase the capacity and/or coverage of existing wireless systems by addition of an antenna array. This enables the simultaneous transmission of parallel data streams between a base station and a user, so called multiple-input-multiple-output (MIMO) transmission. In some cases, such as when millimeter-wave (mmW) carrier frequencies are used, the main desired effect is rather to enhance coverage by exploiting the high beamforming gain of the new AAS systems.

A consequence of the increasing beamforming gain is that the radiated energy is concentrated in beams, in which the effective radiated power is increased as compared to the situation without AAS systems. The RF exposure limits are typically expressed in terms of power density ($W/m^2$) which in the far field is proportional to the effective isotropic radiated power (EIRP), i.e. the power radiated from an antenna with unity antenna gain in all directions. Consequently, the EIRP can be used to determine the power density in the far field. This implies that at a given distance from the antenna, and in the far field, the experienced momentary EIRP and power density will be higher in a beam generated by an AAS system with beam forming gain, than without such an AAS system.

The ICNIRP and other RF exposure limitations are usually expressed as an average power density over a specified time interval T. This means that the momentary or instantaneous power density can be higher than the specified limit, but the average power density must be below the limit. It will further be understood that the power density varies inversely with distance from the transmitter. The distance from the transmitter at which the specified limit is met is referred to as the "compliance distance". To maintain a certain RF exposure compliance distance, which is shorter than that obtained using the maximum momentary EIRP of the AAS, the time-averaged power needs to be maintained at or below a pre-determined threshold.

SUMMARY

The present disclosure provides methods, apparatus and computer programs which seek to mitigate these and other problems.

An aspect of the present invention provides a method in a network node for controlling a radio transmitter. In each one of a plurality of consecutive control steps spanning a predetermined control window, determining a first limit representing a number of physical resource blocks, PRBs, that can be scheduled in each one of a plurality of consecutive future slots of a current control step, based at least in part on an allowable average output power of the radio transmitter. The control window comprises a plurality of control steps, and each control step comprises a plurality of slots. When the determined first limit is less than or equal to a pre-configured second limit representing a number of PRBs that can be scheduled in a single slot, scheduling PRBs in a proportion of the plurality of consecutive future slots of the current control step, the proportion being calculated such that an averaged fraction of scheduled PRBs in the current control step is less than or equal to the first limit.

In some embodiments, the first limit may be a respective first fraction of a total number of PRBs of the wireless network, and the second limit may be a respective second fraction of a total number of PRBs of the wireless network.

In some embodiments, the step of determining the first limit comprises: calculating an allowable average output power of the radio transmitter over a plurality of consecutive future control steps, based at least in part on a profile of the output power of the radio transmitter over a predetermined plurality of past control steps, and future momentary output powers of the radio transmitter that are limited to be equal to or less than a predetermined average output power of the radio transmitter; and determining the maximum number of PRBs that can be scheduled based at least in part on the calculated allowable average output power and a predetermined output power reference value.

In some embodiments, calculating an allowable average output power of the radio transmitter comprises recursively calculating, for each value of an index i, starting at i=N and decrementing to i=2;

$$P_{backward,i} = P_{backward,i+1} + P_{tot}(t_0 + (i - (N-1))T_S)); \text{ and}$$

$$\langle P_{tot}\rangle(t_0 + iT_S) = \frac{iaP_{max,site} + P_{backward,i}}{N}$$

where: $\langle P_{tot}\rangle$ ($t_0+iT_S$) is the allowable average output power of the radio transmitter in the ith future control step; $t_0$ is a time reference of a current control step; $T_S$ is a duration of each control step; $aP_{max,site}$ is the predetermined average output power threshold of the radio transmitter; N is the number of consecutive future control steps; and $P_{backward,i}$ is the value of the output power profile in a past control step associated with the ith future control step.

In some embodiments, the predetermined average output power reference value is ($\varepsilon P_{max,site}$−e), where $\varepsilon$ is a predetermined relative limit and e is a predetermined margin, and wherein determining the maximum number of PRBs that can be scheduled comprises setting the maximum number of PRBs that can be scheduled in the ith future control step to a hard limit value corresponding to the predetermined output power reference value, when the allowable average output power of the radio transmitter in the ith future control step is greater than the predetermined average output power reference value.

In some embodiments, a lower limit of PRBs that can be scheduled in a single slot is an integer multiple of a frequency-domain scheduling granularity. The frequency-domain scheduling granularity may be equal to at least two PRBs. In some specific embodiments the frequency-domain scheduling granularity is equal to eight PRBs.

In some embodiments, scheduling PRBs in the proportion of the plurality of consecutive future slots comprises:
scheduling Physical Downlink Shared Channel, PDSCH, in at most $n_{PRBs}(t)$ PRBs in $k_{blanking}(t)$ out of N future slots; and
scheduling no PDSCH in [N−$k_{blanking}(t)$] of the N future slots;
where: $n_{PRBs}(t)$ is the number of PRBs that are scheduled for a non blanked slot; $n_{PRBs,total}$ is the total number of PRBs in one slot; $n_{granularity}$ is the minimum number of PRBs that may be scheduled in each slot; N is the number of future slots; and $k_{blanking}(t)$ is the number of slots that are not blanked, out of the N future consecutive slots.

In some embodiments, the number of slots that are not blanked, out of the N future slots, corresponds with:

$$k_{blanking}(t) = \max\left(1, \text{floor}\left(\frac{N\gamma(t)}{\gamma_{low}}\right)\right)$$

where: $\gamma(t)$ is the first limit; and $\gamma_{low}$ is the second limit.

Embodiments of a base station, communication system, and a method in a communication system are also disclosed.

BRIEF DESCRIPTION OF THE DRAWINGS

The accompanying drawing figures incorporated in and forming a part of this specification illustrate several aspects of the disclosure, and together with the description serve to explain principles of the disclosure.

FIGS. 10A and 10B illustrate elements of a representative method in accordance with embodiments of the present invention.

DETAILED DESCRIPTION

Figure 1:
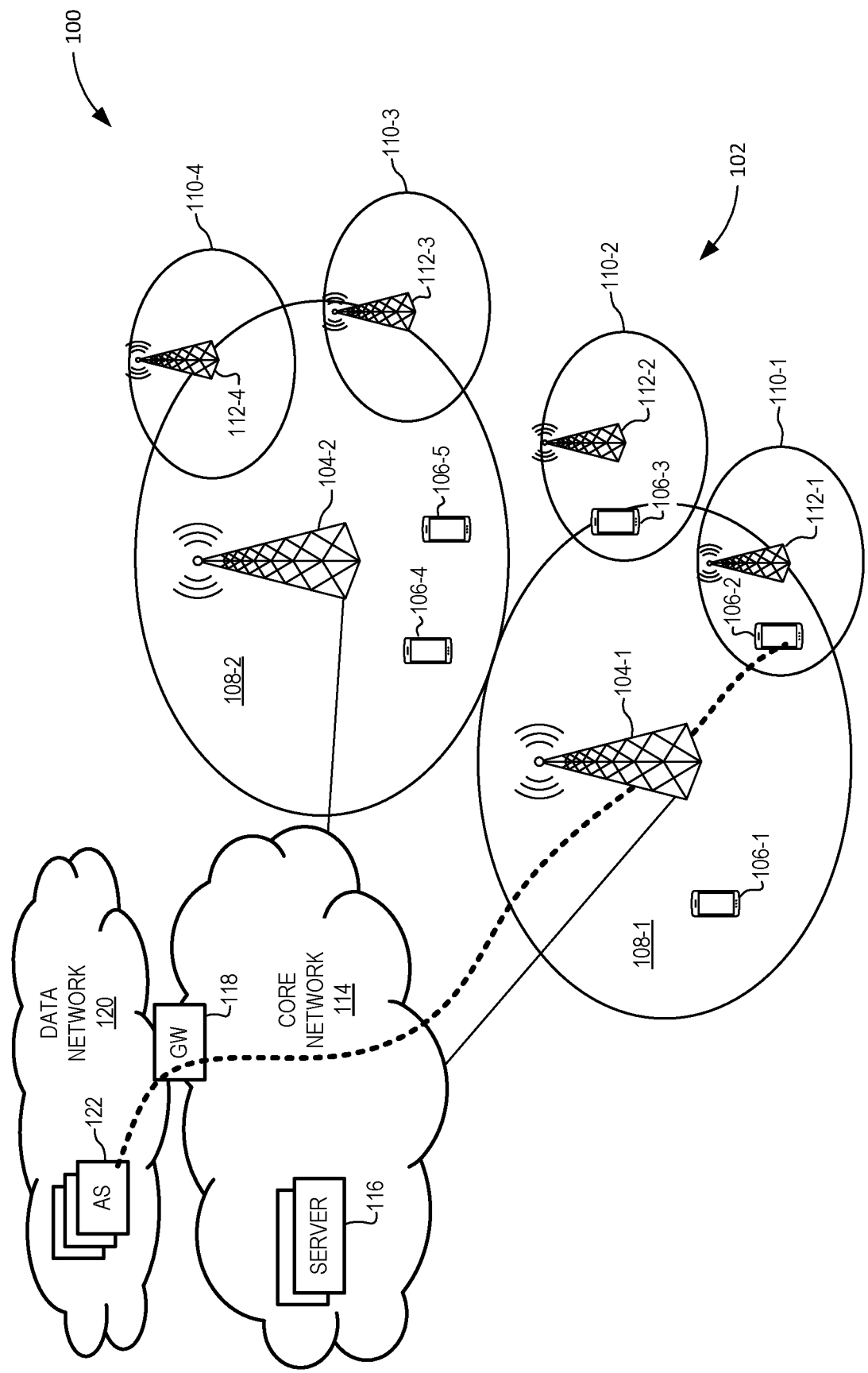
FIG. 1 is a block diagram schematically illustrating a representative network in which embodiments of the present invention may be deployed.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

At least some of the following abbreviations and terms may be used in this disclosure.
2D Two Dimensional
3GPP Third Generation Partnership Project
5G Fifth Generation
AAS Antenna Array System
AoA Angle of Arrival
AoD Angle of Departure
ASIC Application Specific Integrated Circuit
BF Beamforming
BLER Block Error Rate
BW Beamwidth
CPU Central Processing Unit
CSI Channel State Information
dB Decibel
DCI Downlink Control Information
DFT Discrete Fourier Transform
DSP Digital Signal Processor
eNB Enhanced or Evolved Node B
FIR Finite Impulse Response
FPGA Field Programmable Gate Array
gNB New Radio Base Station
ICC Information Carrying Capacity
IIR Infinite Impulse Response
LTE Long Term Evolution
MIMO Multiple Input Multiple Output
MME Mobility Management Entity
MMSE Minimum Mean Square Error
MTC Machine Type Communication
NR New Radio
OTT Over-the-Top
PBCH Physical Broadcast Channel
PDCCH Physical Downlink Control Channel
PDSCH Physical Downlink Shared Channel
P-GW Packet Data Network Gateway
RAM Random Access Memory
ROM Read Only Memory
RRC Radio Resource Control
RRH Remote Radio Head
SCEF Service Capability Exposure Function
SINR Signal to Interference plus Noise Ratio
TBS Transmission Block Size
UE User Equipment
ULA Uniform Linear Array
URA Uniform Rectangular Array Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting (and/or receiving) signals to (and/or from) a radio access node. Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Cell: As used herein, a "cell" is a combination of radio resources (such as, for example, antenna port allocation, time and frequency) that a wireless device may use to exchange radio signals with a radio access node, which may be referred to as a host node or a serving node of the cell. However, it is important to note that beams may be used instead of cells, particularly with respect to 5G NR. As such, it should be appreciated that the techniques described herein are equally applicable to both cells and beams.

References in this disclosure to various technical standards (such as 3GPP TS 38.211 V15.1.0 (2018 March) and 3GPP TS 38.214 V15.1.0 (2018 March), for example) should be understood to refer to the specific version(s) of such standard(s) that was(were) current at the time the present application was filed, and may also refer to applicable counterparts and successors of such versions, as applicable.

The description herein focuses on a 3GPP cellular communications system and, as such, 3GPP terminology or terminology similar to 3GPP terminology is oftentimes used. However, the concepts disclosed herein are not limited to a 3GPP system.

FIG. 1 illustrates one example of a cellular communications network 100 in which embodiments of the present disclosure may be implemented. In the embodiments described herein, the cellular communications network 100 is a Public Land Mobility Network (PLMN) conforming to one or more of the LTE, 3G, 4G and 5G NR standards, or their successors. In the illustrated example, the cellular communications network 100 includes a (Radio) Access Network ((R)AN) 102 comprising base stations 104-1 and 104-2 controlling radio communications with wireless devices 106-1, 106-2, 106-3, 106-4,106-5 within corresponding macro cells 108-1 and 108-2. Each macro cell 108 may be defined by any suitable combination of geography, frequency, Radio Access Technology (RAT) and modulation scheme.

Base stations 104 can be any type of network access device capable of establishing radio connection(s) with one or more wireless devices 106 within a respective coverage area of the base station 104 or low power node 112, and further configured to forward subscriber traffic between the core network 114 and the one or more wireless devices 106. An important feature of a base station 104 is that it is configured with both a radio interface configured to send and receive radio signals to and from a wireless device 106, and a network interface configured to exchange electronic and/or optical signals with the core network 114. Examples of base stations 104 and low power nodes 112 include: Evolved Node B (eNB) systems (known, for example, in the 3GPP standards): Wireless Local Area Network (WLAN) access points (known, for example from IEEE 802.11 standards) or the like. In some contexts, a base station 104 may be referred to as an access point (AP) regardless of the Radio Access Technology (RAT) that it supports.

In the present disclosure, base stations 104 and low power nodes 112 may be generically referred to a radio transmitters or transmission points.

The illustrated (R)AN 102 also includes small cells 110-1 through 110-4, within which radio communication can be controlled by corresponding low power nodes 112-1 through 112-4. As with the macro cells 108, each small cell may be defined by any suitable combination of geography, frequency, Radio Access Technology (RAT) and modulation scheme. As with the base stations 104, a low power node 112 can be any type of network access device capable of establishing radio connection(s) with one or more wireless devices 106 within a respective coverage area of the low power node 112, and further configured to forward subscriber traffic between the core network 114 and the one or more wireless devices 106. An important feature of a low power node 112 is that it is configured with both a radio interface configured to send and receive radio signals to and from a wireless device 106, and a network interface configured to exchange electronic and/or optical signals with the core network 114. In some embodiments, a low power node 112 may be connected to the core network 114 by a direct connection, such as an optical cable. In other embodiments, a low power node 112 may be connected to the core network 114 by an indirect connection, such as via a radio or optical fiber link to a base station 104. Examples of low power nodes 112 include: Remote Radio Heads (RRHs) connected to a base station or a network router (not shown): WLAN access points or the like. In some contexts, a low power node 112 may be referred to as an access point (AP) regardless of the specific Radio Access Technology (RAT) that it supports.

Notably, while not illustrated, a particular small cell 110 may alternatively be controlled by a base station 104, for example using a beam-forming technique. In such cases, the particular small cell 110 will not be associated with a respective low power node 112 per se. Rather, the particular small cell 110 will be associated with a respective set of parameters implemented in the base station 104. In this disclosure, the term "cell" is used to refer to a defined combination of parameters (such as geography, frequency, Radio Access Technology (RAT), modulation scheme, identifiers and the like) that can be used by a wireless device 106 to access communication services of the network 100. The term "cell" does not imply any particular parameter values, or any particular physical configuration of devices needed to enable a wireless device 106 to access those communication services.

Wireless devices 106 can be any type of device capable of sending and receiving radio signals to and from a base station 104 and/or low power node 112. Examples of wireless device 106 include cellular phones, Personal Data Assistants (PDAs), mobile computers, Internet of Things (IoT) devices, autonomous vehicle controllers, and the like. In some contexts, a wireless device 106 may be referred to as a User Equipment (UE) or a mobile device.

In some embodiments, the macro cells 108-1 and 108-2 may overlap each other, and may also overlap one or more small cells 110. For example, a particular macro cell 108-1 may be one macro cell 108 among a plurality of macro cells covering a common geographical region and having a common RAT and modulation scheme, but using respective different frequencies and/or AP identifiers. In such cases, a wireless device 106 located within a region covered by two or more overlapping cells 108, 112 may send and receive radio signals to and from each of the corresponding base stations 104 and/or low power nodes 112.

In the illustrated example, the (R)AN 102 is connected to a Core Network (CN) 114, which may also be referred to as Evolved Core Network (ECN) or Evolved Packet Core (EPC). The CN 114 includes (or, equivalently, is connected to) one or more servers 116 configured to provide networking services such as, for example, Network Functions (NFs) described in 3GPP TS 23.501 V15.2.0 (2018 June) "System Architecture for the 5G System" and its successors. The CN 114 also includes one or more gateway (GW) nodes 118 configured to connect the CN 114 to a packet data network (DN) 120 such as, for example, the internet. A gateway node 118 may be referred to as a packet gateway (PGW) and/or a serving gateway (SGW). The DN 120 may provide communications services to support end-to-end communications between wireless devices 106 and one or more application servers ($AS_s$) 122 configured to exchange data packet flows with the wireless devices 106 via the CN 114 and (R)AN 102. In some contexts, an application server (AS) 122 may also be referred to as a host server.

In some contexts, an end-to-end signal path between an AS 122 and one or more wireless devices 106 may be referred to as an Over-The-Top (OTT) connection. Similarly, a communication service that employs signal transmission between an AS 122 and one or more wireless devices 106 may be referred to as an OTT service.

It should be appreciated that the separation between the CN 114 and the DN 120 can be purely logical, in order to simplify understanding of their respective roles. In particular, the CN 114 is primarily focused on providing wireless device access services and supporting wireless device mobility. On the other hand, the DN 120 is primarily focused on providing end-to-end communications, particularly across network domains. However, it will be appreciated that both the CN 114 and the DN 120 can be implemented on common physical network infrastructure, if desired.

Figure 2A:
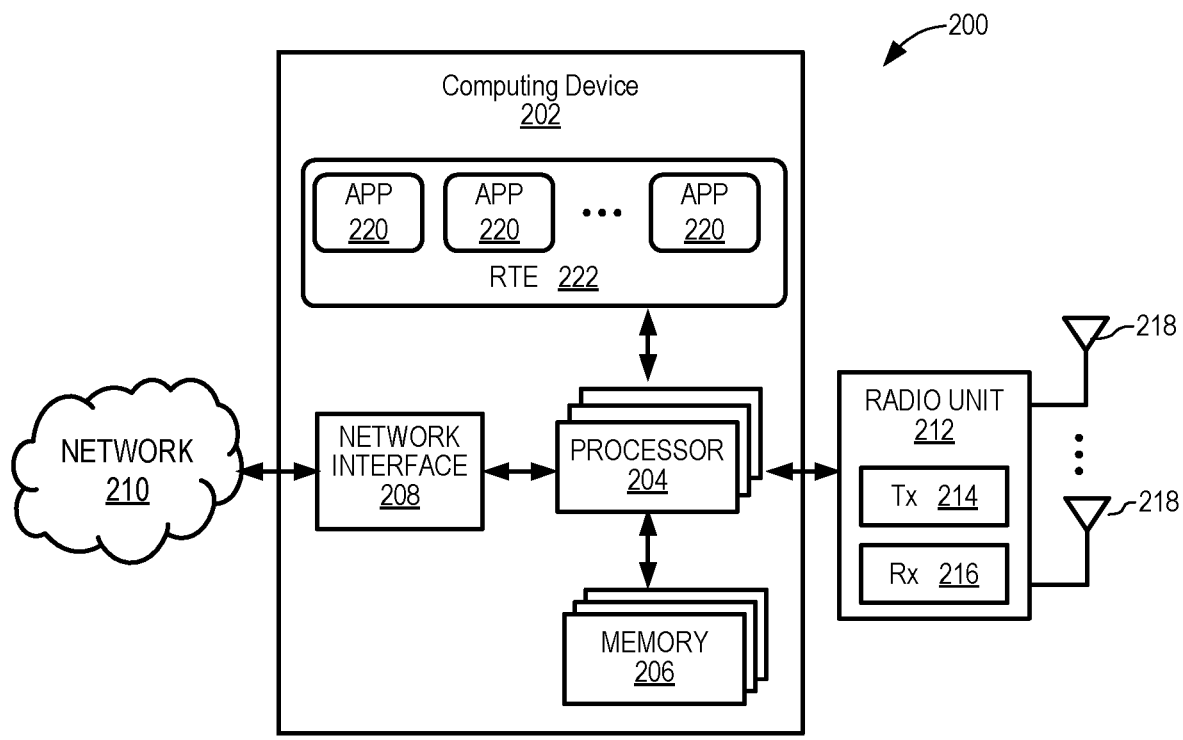
FIGS. 2A and 2B are block diagrams schematically illustrating examples of a computing device usable in embodiments of the present invention.
Figure 2B:
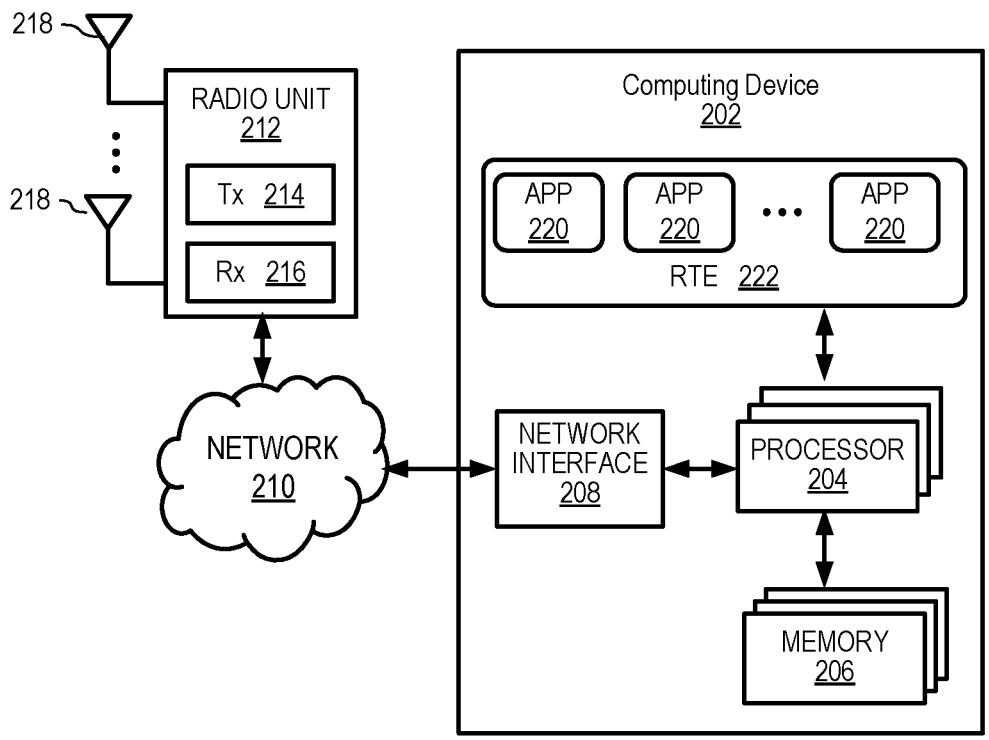

FIGS. 2A and 2B is a block diagram schematically illustrating a communications system 200 including a computing device 202 usable in embodiments of the present invention. In various embodiments, any or all of the base stations 104 or 112, wireless devices 106, core network servers 116 or gateways 118 and data network servers 122 may be implemented using systems and principles in accordance with the computing device 202. It may also be appreciated that any or all of the elements of the network 100 may be virtualized using techniques known in the art or developed in the future, in which case the functions of any or all the base stations 104 or 112, core network servers 116 or gateways 118, and/or any or all of the network functions 206-226 may be implemented by suitable software executing within a computing device 202 or within a data center (non shown) composed of multiple computing devices 202.

In the example of FIG. 2A, the communications system 200 generally includes computing device 202 connected to one or more networks 210 and one or more radio units 212. The computing device 202 includes one or more processors 204, a memory 206, one or more network interfaces 208. The processors 204 may be provided as any suitable combination of Central Processing Units (CPUs), Application Specific Integrated Circuits (ASICs), Field Programmable Gate Arrays (FPGAs), or the like. Similarly, the memory 206 may be provided as any suitable combination of Random Access Memory (RAM), Read Only Memory (ROM) and mass storage technologies such as magnetic or optical disc storage or the like. The network interfaces 208 enable signaling between the computing device 200 and the networks 210, such as the Core Network 114, the data network 120, or a private domain network such as a data center (not shown).

Each radio unit 212 typically includes at least one transmitter (Tx) 214 and at least one receiver (Rx) 216 coupled to one or more antennas 218. In the example of FIG. 2A, the radio unit(s) 212 is(are) shown as being external to the computing device 202 and connected to the computing device 202 via a suitable physical connection (such as a copper cable or an optical cable). In the example of FIG. 2B, the radio unit(s) 212 is(are) shown as being connected to computing device 202 via a network 210 and a network interface 208. In still other embodiments, the radio unit(s) 212 and optionally also the antenna(s) 218 may be integrated together with the computing device 202.

The one or more processors 204 operate to provide functions of the computing device 202. Typically, these function(s) are implemented as software applications (APPs) 220 or modules that are stored in the memory 206, for example, and executed by the one or more processors 204. In some embodiments, one or more software applications or modules 220 may execute within a secure run-time environment (RTE) 222 maintained by an operating system (not shown) of the computing device 202.

It may be appreciated that specific embodiments may exclude one or more of the elements illustrated in FIGS. 2A and 2B. For example, a computing device 202 configured to implement a wireless device 106 may incorporate one or more processors 204, a memory 206, and one or more radio units 212, but may exclude a network interface 208. Conversely, a computing device 202 configured to implement a server 116 or 122 may include one or more processors 204, a memory 206, and one or more network interfaces 208, but may exclude radio units 212. A computing device 202 configured to implement a base station 104 or 112, on the other hand, will normally include one or more processors 204, a memory 206, and both radio units 212 and network interfaces 208.

Figure 3:
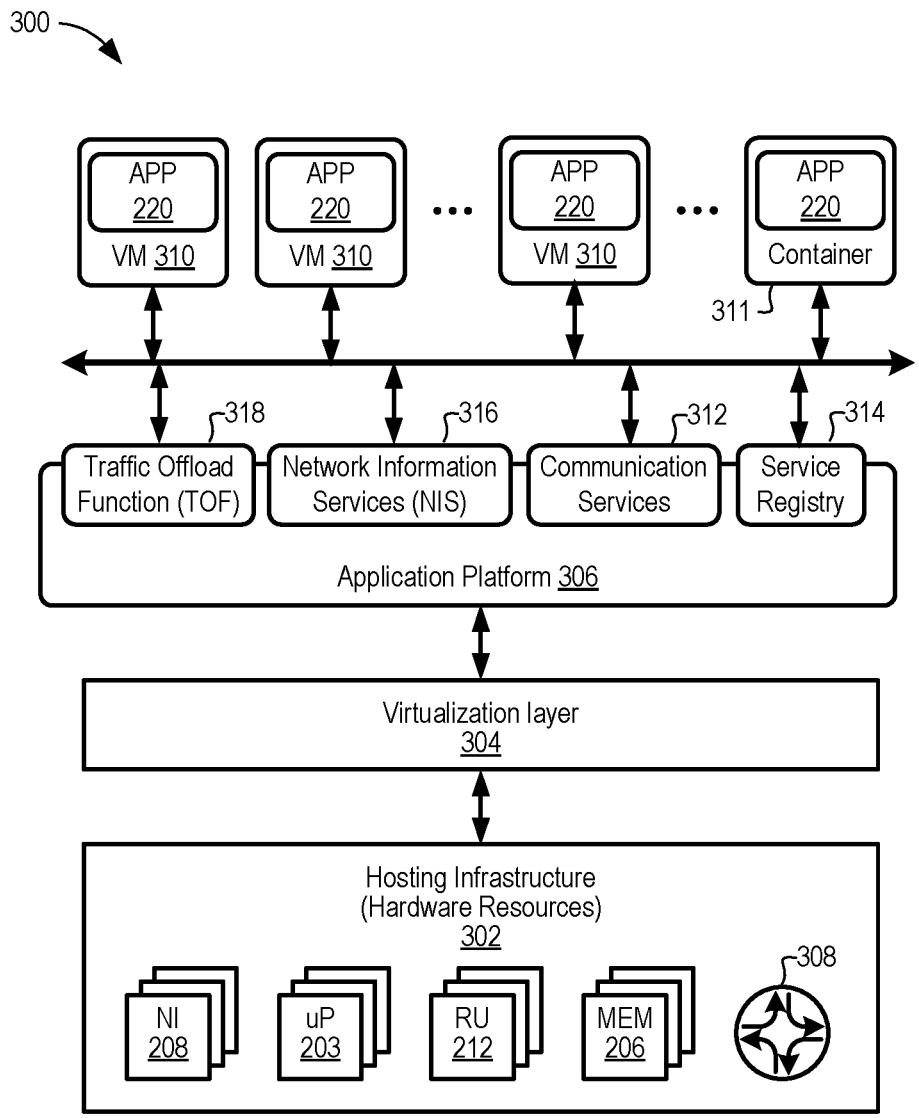
FIG. 3 is a block diagram schematically illustrating an architecture of a representative network element virtualization usable in embodiments of the present invention.

FIG. 3 is a block diagram schematically illustrating an example architecture for network element virtualization usable in embodiments of the present invention. It is contemplated that the network elements may be physically implemented using one or more computers, data storage devices and routers (any or all of which may be constructed in accordance with the system 200 described above with reference to FIG. 3) interconnected together and executing suitable software to perform its intended functions. Those of ordinary skill will recognize that there are many suitable combinations of hardware and software that may be used for this purpose, which are either known in the art or may be developed in the future. For this reason, a FIG. showing physical hardware components and connections is not included herein.

As may be seen in FIG. 3, the illustrated architecture 300 generally comprises hosting infrastructure 302, a virtualization layer 304 and an Application Platform Services layer 306. The hosting infrastructure 302 comprises physical hardware resources provided by the infrastructure on which the architecture 300 is being implemented. These physical hardware resources may include any or all of the processors 204, memory 206, network interfaces 208 and radio units 212 described above with reference to FIG. 2, and may also include traffic forwarding and routing hardware 308. The virtualization layer 304 presents an abstraction of the hardware resources 302 to the Application Platform Services layer 306. The specific details of this abstraction will depend on the requirements of the applications 220 being hosted by the Application Platform Services layer 306. Thus, for example, an APP 220 that provides traffic forwarding functions (for example as part of a UPF 206) may be presented with an abstraction of the hardware resources 306 (e.g. processor(s) 204, memory 206 and traffic forwarding hardware 308) that simplifies the implementation of traffic forwarding policies. Similarly, an application that provides data storage functions (for example implementing a UDM 222 and/or a UDR 224) may be presented with an abstraction of the hardware resources 306 (e.g. processor(s) 204 and memory 206) that facilitates the storage and retrieval of data (for example using Lightweight Directory Access Protocol-LDAP).

The application platform 306 provides the capabilities for hosting applications. In some embodiments, the application platform 306 supports a flexible and efficient multi-tenancy run-time and hosting environment for applications 220 by providing Infrastructure as a Service (IaaS) facilities. In operation, the application platform 306 may provide a security and resource "sandbox" for each application 220 being hosted by the platform 306. Each "sandbox" may be implemented as a Virtual Machine (VM) image 310 that may include an appropriate operating system and controlled access to (virtualized) hardware resources 302. Alternatively, each "sandbox" may be implemented as a container 311 that may include appropriate virtual memory and controlled access to host operating system and (virtualized) hardware resources 302. The application platform 306 may also provide a set of middleware application services and infrastructure services to the applications 220 hosted on the application platform 306, as will be described in greater detail below.

Applications 220 from vendors, service providers, and third-parties may be deployed and executed within a respective Virtual Machine 310. For example, PCF 220 may be implemented by means of one or more applications 220 hosted on the application platform 306 as described above. Communication between applications 220 and services of the application platform 306 may conveniently be designed according to the principles of Service-Oriented Architecture (SOA) known in the art.

Communication services 312 may allow applications 220 to communicate with the application platform 306 (through pre-defined Application Programming Interfaces (APIs) for example) and with each other (for example through a service-specific API).

A Service registry 314 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Network Information Services (NIS) 316 may provide applications 220 with low-level network information pertaining to a network service instance or one or more PDU sessions, for example. For example, the information provided by NIS 316 may be used by an application 220 to calculate and present relevant data (such as: cell-ID, location of the subscriber, cell load and throughput guidance) to SMF 208, AMF 210 and PCF 220, any or all of which may themselves to implemented by applications 220 executing in respective VMs 310.

A Traffic Off-Load Function (TOF) service 318 may prioritize traffic, and route selected, policy-based, data streams to and from applications 220.

Those skilled in the art will appreciate that wireless signals are transmitted between a radio access node 104,112 and the wireless devices 106 using radio resources which are scheduled according to one or more scheduling algorithms. A scheduler may be provided in the radio access node 104,112 or logically coupled to the radio access node for this purpose. As used herein, "radio resources" refers to any available resource which can be used to transmit wireless signals, such as frequency (e.g. one or more frequency channels or sub-channels), time (e.g. one or more frames, sub-frames, slots, etc) or codes (e.g. as used for code-division multiplexing).

Thus, for downlink communications (i.e. from the radio access node 104,112 to the wireless devices 106), a pool of available radio resources is distributed for transmissions to the wireless devices 106 according to a scheduling algorithm. Various scheduling algorithms are known in the art, and the present disclosure is not limited in that respect. Suitable examples include round robin, fair queuing, proportionally fair scheduling and maximum throughput.

Those skilled in the art will appreciate that the output power of a radio access node varies as a function of the resources it uses for transmissions. For example, when the radio access node is scheduled to transmit using a relatively large amount of resources at any one time (e.g. a relatively large number of frequencies), the output power of that radio access node will also be relatively high. Conversely, when the radio access node is scheduled to transmit using relatively few resources at any one time, the output power of that radio access node will be relatively low.

Embodiments of the present disclosure utilize this property to control the output of a transmission point (e.g. a radio access node) of a wireless communications network. In one embodiment, the output of the transmission point is controlled so that an average transmitted power requirement is met.

The radio access node is thus provided with a pool of radio resources with which to schedule transmissions to the wireless devices 106. Embodiments of the disclosure apply limitations to this pool of radio resources so as to limit the output power of the radio access node or transmission point. For example, the radio access node may be permitted to utilize only a fraction of its available pool of radio resources for scheduling transmissions to the wireless devices 106.

A specific problem with some RATs (such as 5G, for example) that reduces the control range of an average power control system, due to the smallest scheduling granularity in the frequency domain. For example, in the current 5G standards, the smallest scheduling granularity is 8 physical resource blocks (PRBs). This means that when average power control is applied in some bandwidths, the average power limit cannot be set lower than about 20% of the access node power. However, this is undesirable because the minimum scheduling granularity of 8 PRBs means that zero traffic must be scheduled to meet the average power constraints, should these be below 20%. This is not acceptable for most operators, since such zero scheduling could persist for at least 0.6 seconds.

At the same time some countries have adopted RF EMF exposure limits that are significantly lower than the international science-based limits recommended by ICNIRP. In these countries the operators may therefore request a lower minimum setting of the average power than 20%, such as 10%.

The present disclosure provides techniques that enable the lower limit of the average power control range to be reduced well below the level corresponding to the 8 PRB minimum scheduling granularity.

Systems and methods are disclosed herein that provide an enhanced algorithm for average power (such as EIRP) control.

Figure 9:
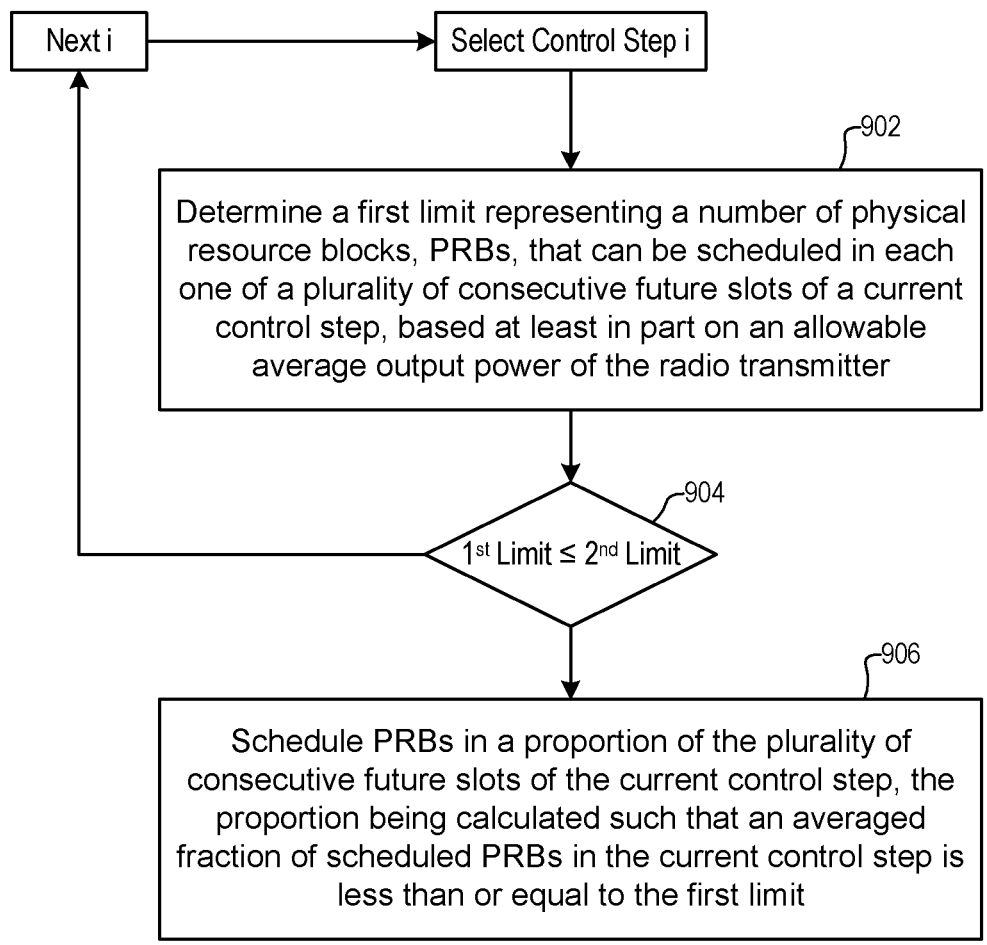
FIG. 9 is a flow chart illustrating a representative method in accordance with embodiments of the present invention.

Referring to FIG. 9, an aspect of the present invention provides a method in a network node for controlling a radio transmitter. In each one of a plurality of consecutive control steps spanning a predetermined control window, determining (906) a first limit representing a number of physical resource blocks, PRBs, that can be scheduled in each one of a plurality of consecutive future slots of a current control step, based at least in part on an allowable average output power of the radio transmitter. The control window comprises a plurality of control steps, and each control step comprises a plurality of slots. When the determined first limit is less than or equal to a pre-configured second limit representing a number of PRBs that can be scheduled in a single slot (904), scheduling (906) PRBs in a proportion of the plurality of consecutive future slots of the current control step, the proportion being calculated such that an averaged fraction of scheduled PRBs in the current control step is less than or equal to the first limit.

In some embodiments, the first limit may be a respective first fraction of a total number of PRBs of the wireless network, and the second limit may be a respective second fraction of a total number of PRBs of the wireless network.

In some embodiments, the step of determining the first limit comprises: calculating an allowable average output power of the radio transmitter over a plurality of consecutive future control steps, based at least in part on a profile of the output power of the radio transmitter over a predetermined plurality of past control steps, and future momentary output powers of the radio transmitter that are limited to be equal to or less than a predetermined average output power of the radio transmitter; and determining the maximum number of PRBs that can be scheduled based at least in part on the calculated allowable average output power and a predetermined average output power reference value.

In some embodiments, calculating an allowable average output power of the radio transmitter comprises recursively calculating, for each value of an index i, starting at i=N and decrementing to i=2;

$$P_{backward,i} = P_{backward,i+1} + P_{tot}(t_0 + (i-(N-1))T_S)); \text{ and}$$

$$\langle P_{tot} \rangle (t_0 + iT_S) = \frac{iaP_{max,site} + P_{backward,i}}{N}$$

where: $\langle P_{tot} \rangle (t_0+iT_S)$ is the allowable average output power of the radio transmitter in the ith future control step; $t_0$ is a time reference of a current control step; $T_S$ is a duration of each control step; $aP_{max,site}$ is the predetermined average output power threshold of the radio transmitter; N is the number of consecutive future control steps; and $P_{backward,i}$ is the value of the output power profile in a past control step associated with the ith future control step.

In some embodiments, the predetermined average output power reference value is ($\varepsilon P_{max,site}$-e), where $\varepsilon$ is a predetermined relative limit and e is a predetermined margin, and wherein determining the maximum number of PRBs that can be scheduled comprises setting the maximum number of PRBs that can be scheduled in the ith future control step to a hard limit value corresponding to the predetermined average output power reference value, when the allowable average output power of the radio transmitter in the ith future control step is greater than the predetermined average output power reference value.

In some embodiments, a lower limit of PRBs that can be scheduled in a single slot is an integer multiple of a frequency-domain scheduling granularity. The frequency-domain scheduling granularity may be equal to at least two PRBs. In some specific embodiments the frequency-domain scheduling granularity is equal to eight PRBs.

In some embodiments, scheduling PRBs in the proportion of the plurality of consecutive future slots comprises:
scheduling Physical Downlink Shared Channel, PDSCH, in at most $n_{PRBs}(t)$ PRBs in $k_{blanking}(t)$ out of N future slots; and
scheduling no PDSCH in [N–$k_{blanking}(t)$] of the N future slots;
where: $n_{PRBs}(t)$ is the number of PRBs that are scheduled for a non blanked slot; $n_{PRBs,total}$ is the total number of PRBs in one slot; $n_{granularity}$ is the minimum number of PRBs that may be scheduled in each slot; N is the number of future slots; and $k_{blanking}(t)$ is the number of slots that are not blanked, out of the N future consecutive slots.

In some embodiments, the number of slots that are not blanked, out of the N future slots, corresponds with:

$$k_{blanking}(t) = \max\left(1, \text{floor}\left(\frac{N\gamma(t)}{\gamma_{low}}\right)\right)$$

where: $\gamma(t)$ is the first limit; and $\gamma_{low}$ is the second limit.

In some embodiments, the algorithm includes scheduler blanking averaged over time. Whenever the average power controller would benefit from scheduling of fewer PRBs than the minimum scheduling granularity, the required proportion of PRBs less than the minimum scheduling granularity is computed and quantized. A scheme that schedules zero traffic for some scheduling times (e.g. slots) and the minimum scheduling granularity otherwise is then applied so that the calculated fraction is achieved when measured as an average over a chosen time period.

In some embodiments, a forward looking safety net is provided, which enables a further enhanced range by allowing a more aggressive average power control reference value setting without risking an overshoot of the configured average power threshold. This increased reference value enhances the controller range downward by a corresponding amount.

The dynamic actuator and PD controller described below represents an example of an average power controller, that can be given an enhanced range with the techniques disclosed herein.

The following paragraphs explain the basics of the terminology used when describing linear frequency domain functionality for automatic control, which is useful for understanding elements of the present invention.

A dynamic process is one where the output depends not only on an input signal but also on previous inputs and outputs. Put otherwise the dynamic process has memory. The most basic dynamic process is a linear process that can be described by a differential equation as:

$$y^{(n)}(t) + a_1 y^{(n-1)}(t) + \ldots + a_1 y(t) = b_0 u^{(m)}(t) + \ldots + b_m u(t)$$

Here y(t) is the output signal, u(t) is the input signal, t is the time, while $a_i$, i=1 ... n and $b_j$, j=1 ... m are constant parameters. $(\ )^{(i)}$ denotes differentiation with regard to time, i times. The above differential equation has order n. It has one input signal and one output signal. For simplicity all concepts are explained in this context, but the generalization to more than one input signal and more than one input signal is well known from readily available textbooks.

By taking Laplace transforms and setting initial values to zero, the differential equation is transformed to be represented by a transfer function H(s), where s denotes the Laplace transform variable which is closely related to the angular frequency used in Fourier transforms. The result is:

$$H(s) = \frac{B(s)}{A(s)} = \frac{b_0 s^m + b_m s^{m-1} + \cdots + b_m}{s^n + a_1 s^{n-1} + \cdots + a_n}$$

The relation between the output signal and input signal Laplace transforms Y(s) and U(s) are $$Y(s) = H(s)U(s)$$

The poles $p_i, i=1 \ldots n$ of the process are given by the equation $A(s)=0$. For simplicity only strictly stable (open loop) processes with all poles in the left complex half plane is considered here. In general poles are real or complex conjugate pairs.

The properties of the dynamic process can also be studied in the frequency domain in terms of complex valued frequency functions $Y(j\omega)$, $H(j\omega)$ and $U(j\omega)$. $\omega$ denotes the angular frequency that fulfils $$\omega = 2\pi f$$

Where f is the frequency in Hz. Below, frequency is used for angular frequency.

Figure 4:
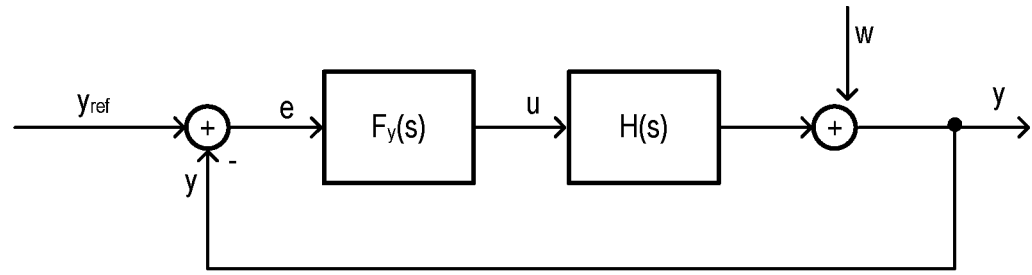
FIG. 4 is a block diagram illustrating a feedback control system.

The following definition are best explained with respect to FIG. 4, where $F_y(s)$ is the feedback gain. The closed loop system is then computed as follows $$Y(s) = W(s) + H(s)F_y(s)(Y_{ref}(s) - Y(s))$$

which gives $$Y(s) = \frac{F_y(s)H(s)}{1 + F_y(s)H(s)} Y_{ref}(s) + \frac{1}{1 + F_y(s)H(s)} W(s)$$

This gives the effect of the reference signal and the disturbance on the output. The remaining definitions are described below.

The closed loop bandwidth $\omega_{CL}$ of the control system is given by the equation $$\left| \frac{F_y(j\omega_{CL})H(j\omega_{CL})}{1 + F_y(j\omega_{CL})H(j\omega_{CL})} \right|^2 = \frac{1}{2} \left| \frac{F_y(0)H(0)}{1 + F_y(0)H(0)} \right|^2$$

The closed loop static error of the control system is given by the equation $$y_{ref} - y = \frac{1}{1 + F_y(0)H(0)}(y_{ref} - w)$$

The static disturbance rejection of the control system is given by the static sensitivity function $$S(0) = \frac{1}{1 + F_y(0)H(0)}$$

The dynamic disturbance rejection of the control system is determined by the sensitivity function $$S(j\omega) = \frac{1}{1 + F_y(j\omega)H(j\omega)}$$

The complimentary sensitivity function of the control system, $T(j\omega) = 1 - S(j\omega)$ determines the robustness of the control system with respect to un-modelled dynamics.

Figure 5A:
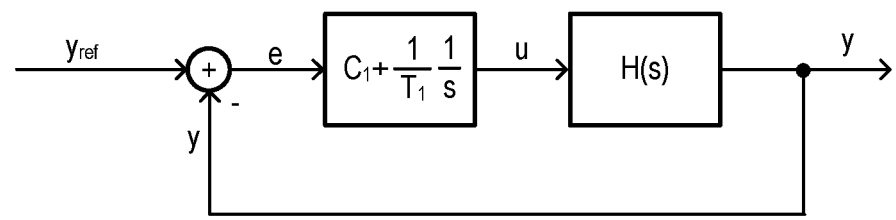
FIGS. 5A and 5B are block diagrams illustrating respective different realizations of PI control.
Figure 5B:
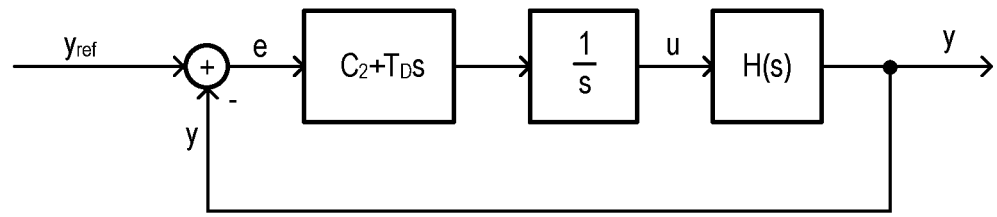

Next, a conventional PI controller is described, with reference to FIGS. 5A and 5B. The idea of integrating control is to compute the control signal from the integral of the control error. In this case, the magnitude of the control signal will increase as long as there is a remaining control error with constant sign. This means that the actuator will act increasingly hard to remove the control error. If the dynamics is linear the only way a steady state solution can be achieved is when the integrating controller steers the control error to zero, in which case $$y_{ref} = y.$$

This property holds when the control system is stable, irrespective of the dynamics of the un-controlled system. This is a key benefit of integrating control. On the other hand, integrating control reduces stability margins. The PI control loop illustrated in FIGS. 5A and 5B avoid this issue by applying a mix of proportional and integrating control, using the dynamic controller $$F_y(s) = \left(C_1 + \frac{1}{T_I}\frac{1}{s}\right).$$

Here $C_1$ is the proportional gain and $T_I$ the integration time. 1/s is the Laplace transform of an integration operation in time. It can be noted that since the controller has two free tuning parameters, the proportional gain and the integration time, arbitrary pole locations can be assigned to any second order feedback loop. Such pole-placement design will be applied to determine the controller in the power back-off control feature.

The example controller described below will make use of the realization of PI control illustrated in FIG. 5B, which factors out an integrator. That integrator may be placed in or close to the scheduler, to produce the desired dynamics of the resource limiting threshold as will be described below. As can be seen in FIG. 5B, the remaining dynamics of the PI-controller resembles a proportional term and a differentiating term. That's why the solution applied average power back-off control is PD control together with an integrating resource limiting threshold. The relation between the parameters of the realizations of FIGS. 5A and 5B are easily obtained by equating the coefficients for equal degrees of s in:

$$C_1 + \frac{1}{T_I}\frac{1}{s} \equiv (C_2 + T_D s)\frac{1}{s} = T_D + C_2 \frac{1}{s}.$$

In order to obtain a smooth behavior of the dynamic resource threshold applied in the scheduler to limit the average output power, it needs to be rate controlled. This means that the control signal commands adjustments to the limiter, making it increase or decrease. The dynamics of the actuator mechanism (dynamic resource threshold) is therefore determined to be $$\dot{\gamma}(t)=u(t),$$

where $\gamma(t)$ is the dynamic resource threshold and where $u(t)$ is the control signal further discussed below. t denotes continuous time. This consistent with the factored PI control structure of FIG. 5B. The dynamic resource threshold is decoupled from the scheduler algorithms themselves, it just expresses a fractional limitation of the scheduler not to use more than a fraction $\gamma(t)$ of its total resources. Details on how this is done are described in detail below.

The maximum value of $\gamma(t)$ is 1.0 since it is to express a fraction of the total amount of scheduler resources. There is also a need to limit its lower value, to avoid that the dynamic feedback control mechanism reduces it to an unphysical value below 0.0. The following scheduler threshold limitation is therefore applied at each time.

$$\gamma_{low} \leq \gamma(t) \leq 1.0$$

The total momentary output power applied to an antenna array can be measured in the radio, just before the antenna. In one embodiment this can be done by couplers that measure the radio signal amplitude at each signal path to an antenna element. These amplitudes can then be combined into a total output power of the radio, with the antenna gain removed.

A simpler, but less accurate alternative would be to replace the measured power by a predicted output power using information available in the scheduler or elsewhere in base band. Such a quantity could be easily obtained, e.g. by summing up the momentary scheduled power as estimated by the fraction of resource elements (REs) or physical resource blocks (PRBs) used at each time instant, over the time T.

This approach is however subject to a number of errors. These include, for example: the actual power errors caused by re-transmissions, power boosting and power sharing between transmission layers errors, as well as errors caused by radio signal processing close to the antenna, including e.g. clipping to achieve peak to average power reductions, and antenna alignment errors.

Figure 6:
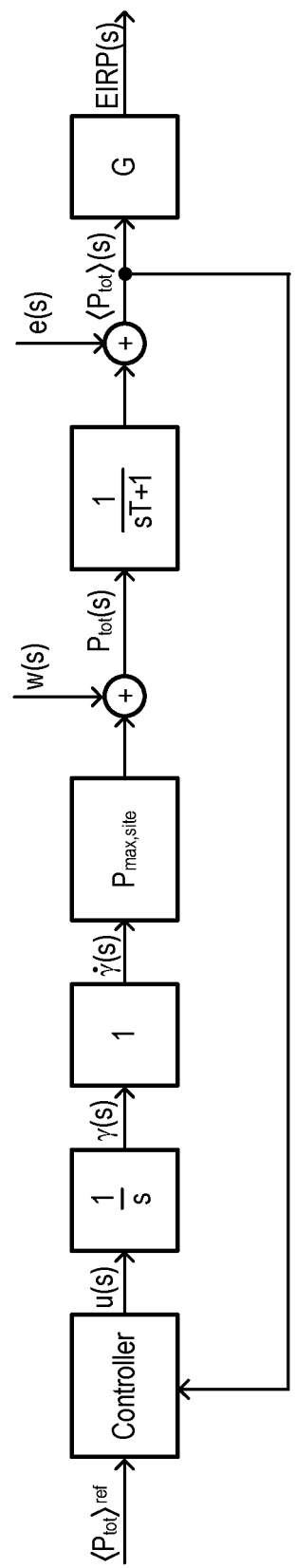
FIG. 6 is a block diagram illustrating a feedback control mechanism.

FIG. 6 is a block diagram illustrating a feedback control mechanism in which feedback control is enabled by a supervision mechanism as described below.

In FIG. 6, $\langle P_{tot} \rangle^{ref}$ denotes the setpoint for the averaged power (typically slightly less than the threshold value determined to meet the regulatory RF EMF limit at a certain distance), 1/s denotes the actuator dynamics with lower and upper limits inactive, $\bar{\gamma}(t)$ denotes the scheduler limitation after lower and upper limitation (inactive in Figure A3), $P_{max,site}$ denotes the maximal total power of the site, $w(t)$ denotes a disturbance representing predicted power errors, $1/(sT+1)$ represents an autoregressive simplified model of the averaging, $\langle P_{tot} \rangle$ (s) denotes the averaged total power, $e(s)$ denotes a measurement error, G denotes the antenna gain and EIRP(s) denotes the EIRP. Note that all quantities are here expressed in the Laplace transform domain, which is allowed since the feedback control mechanism design is performed with constraints inactive. The momentary power described above is denoted $P_{tot}(s)$.

Note: $w(s)$ and $e(s)$ are not incorporated in any disclosed embodiments of the present invention, they are used herein as mathematical approximations of errors in the control loop, and are useful to assess performance aspects of embodiments of the present invention.

It is then assumed that the controller block is given by:

$$u(s)=CT(1+T_D s)(\langle P_{tot} \rangle^{ref} - \langle P_{tot} \rangle(s))$$

This controller is of proportional-derivative (PD) type. C denotes the proportional gain, and $T_D$ the differentiation time. Following standard procedures of automatic control, the poles of the closed loop system of Figure A3 are given by the following second order equation $$s^2(1/T+P_{max,site}CT_D)s+P_{max,site}C=0.$$

These poles govern the closed loop dynamics of the feedback control mechanism, the actuator mechanism, and the averaged power. To determine the proportional gain and the differentiation time, a closed loop polynomial with desired poles in $-\alpha_1$ and $-\alpha_2$ is specified as $$s^2+(\alpha_1+\alpha_2)s+\alpha_1\alpha_2=0.$$

An identification of coefficients and solution of the resulting system of equations reveal that the proportional gain and differentiation time shall be selected as $$C = \frac{\alpha_1 \alpha_2}{P_{max,site}},$$

$$T_D = \frac{\alpha_1 + \alpha_2 - \frac{1}{T}}{\alpha_1 \alpha_2}.$$

A reason for this choice is that a system with two negative real poles can be expected to be well damped, which is a result of a significant differentiation action. Since differentiation action is needed for fast back-off close to the determined threshold, this is the preferred design choice.

Some additional modification of the controller may be made to adapt to the one-sided power back-off control problem formulation. This includes only allowing negative differentiation control, and a hard safety limit applied in case the average power gets too close to the regulatory threshold. The asymmetric differentiation can be formulated as $$u(t)=CTe(t)+CTT_D \max(0,\dot{e}(t)).$$

To implement the feedback control mechanism, $\langle P_{tot} \rangle^{ref}$, $\langle P_{tot} \rangle$ (t) and $\langle P_{tot} \rangle$ (t) are needed. Techniques for obtaining $\langle P_{tot} \rangle$ (t) and $\langle P_{tot} \rangle$ (t) are described below.

The formulation above has been done in continuous time. However, the implementation is to be performed in discrete time. This means that all dynamic parts of the controller and actuator needs to be discretized. The averaging of the momentary power does not need to be discretized since this is done at sampling rate, either by a recursive computation of the true average, or by applying summation. Thus, the equations of the controller and actuator needs to be discretized. Here this is done with an Euler approximation, however other alternatives like the Tustin approximation could be used as well. The Euler approximation replaces the Laplace transform variable s, with the discrete time approximation of this derivative, i.e.

$$s \rightarrow \frac{(q_{T_s})-1}{T_S}$$

Here $T_S$ denotes the sampling period, and $q_{T_s}^{-1}$ is the one step delay operator. It is stressed that this implicitly assumes regular sampling in time, with very little jitter. Sampling cannot be event based. Therefore, a system clock is needed to drive the discrete time feedback control loop.

Starting with the actuator and using the fact that $$s\gamma(s)=u(s)$$

results in the discrete time equation $$\gamma(t+T_S)=\gamma(t)+T_S u(t).$$

When sampling the PD controller, it is noted that there is no effect on the proportional term, however the error signal needs to be differentiated. Since the reference value is constant it follows that it is the derivative of the average power that needs sampling. It is first noted that because of the differentiation, filtering of this derivative is also needed, according to the equation $$y(s) = \frac{\alpha}{s+\alpha}s(\langle P_{tot}\rangle^{ref} - \langle P_{tot}\rangle(s)) = -\frac{\alpha s}{s+\alpha}\langle P_{tot}\rangle(s)$$

where the filter bandwidth may be selected to $\alpha=0.05$ rad/s. Here the derivative is denoted by y(s). Following the same procedure as for the actuator results in the discrete time equation $$y(t)=y(t-T_S)-\alpha T_S y(t-T_S)-\alpha(\langle P_{tot}\rangle(t)-\langle P_{tot}\rangle(t-T_S)).$$

The discrete time control signal therefore becomes $$u(t)=CT(\langle P_{tot}\rangle(t)^{ref}-\langle P_{tot}\rangle(t)-T_D \max(y(t),0.0))$$

Figure 7:
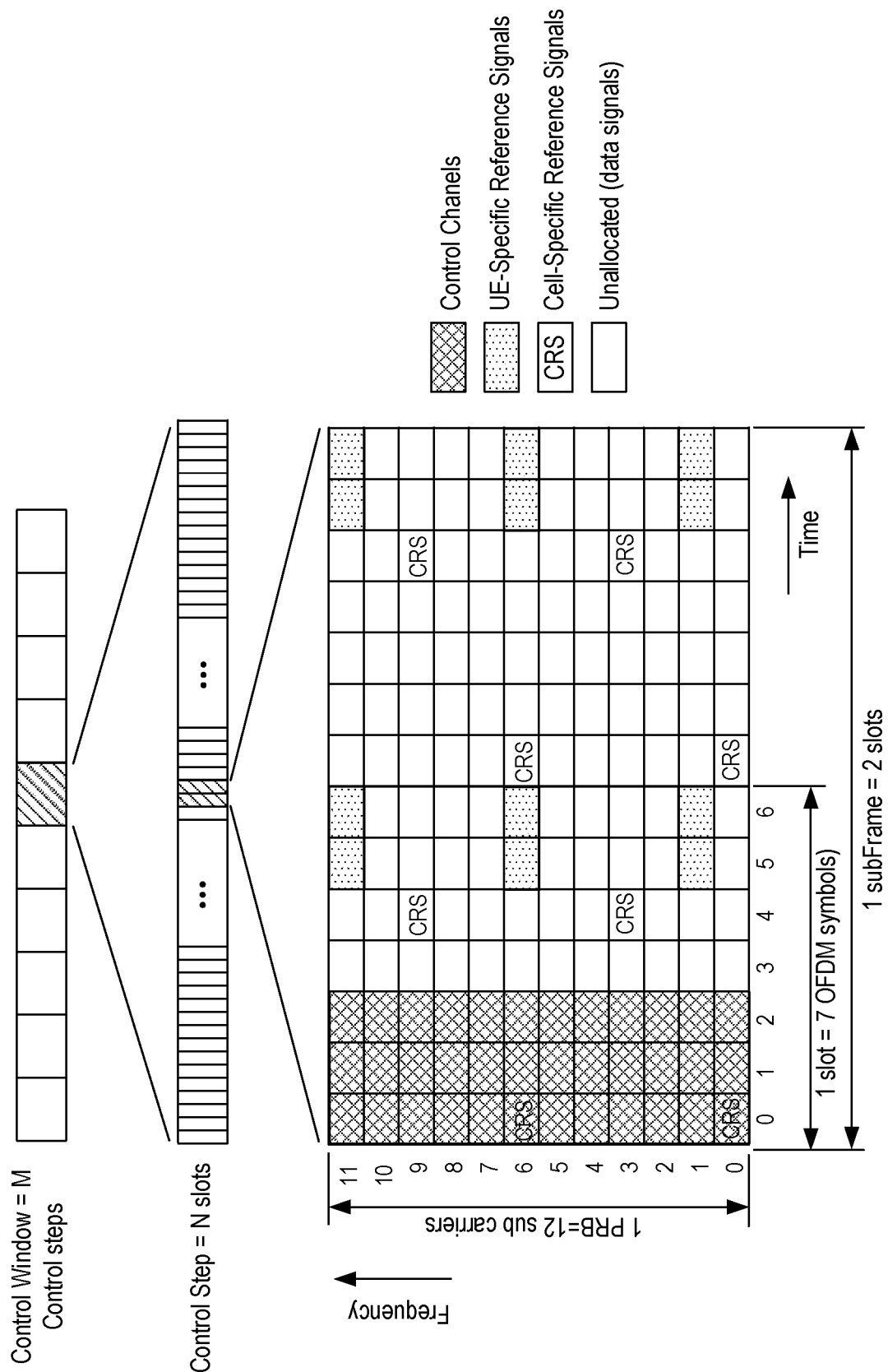
FIG. 7 is a block diagram illustrating an example resource grid usable in conjunction with embodiments of the present invention.

To understand the embodiments of the invention disclosed herein, it is useful to refer to the resource grid of FIG. 7. The resource grid consists of a time-frequency division of radio resources that the scheduler has at its disposal, for scheduling of data to each user. As may be seen in FIG. 7, in the frequency dimension, a physical resource block (PRB) comprises a set of sub-carriers on a defined frequency spacing. In the example illustrated in FIG. 7, the PRB comprises 12 sub-carriers on a 30 kHz spacing, for example. In the illustrated example, 7 OFDM symbols are transmitted within a slot having a defined period, such as 1 mSec. for example. Each time-frequency location within the resource grid is referred to as a resource element (RE). Two successive slots may be taken together to form a sub-frame comprising 12×14=168 REs, which can be allocated as required to enable transmission of control channel signals, synchronization signals, cell-specific reference signals, UE-specific reference signals and data signals destined for UEs. For the purposes of the present disclosure, it is also convenient to consider a Control Step encompassing a predefined number of slots (or subframes, as desired), and a Control Window comprising a predefined number of control steps. For example, a control window may be defined as having a period of 6 minutes, which is the averaging time up to 10 GHz specified in RF EMF exposure regulations based on the ICNIRP guidelines. The control window may be divided into 6000 control steps, each of which will thus have a period of 0.6 seconds. For an embodiment in which each slot has a period of 1 ms, each control step will therefore encompass 600 slots (or 300 sub-frames).

For the purposes of scheduling downlink traffic to UEs, the smallest schedulable entity in the time domain is the slot, while in the frequency domain, the smallest schedulable entity is the PRB.

Conventional average power controllers known in the art typically operate by limitation of the fraction of the total number of physical resource blocks that the scheduler may schedule in each slot. Only downlink data channels (eg. physical downlink shared channel, PDSCH) are limited, the control channels are all left untouched so that the coverage and other basic system properties are left unaffected. The fraction applied is updated with a much slower pace, typically with 600 ms. As discussed above, there is a minimum scheduling granularity, by which PRBs may be scheduled. In a typical network the minimum scheduling granularity of PRBs is eight, meaning that PRBs may only be scheduled in blocks of 8 PRB at a time. The minimum number of PRBs that can be scheduled to obtain non-zero data traffic is therefore typically 8 in NR. Since there are fixed reference signal, synchronization signaling and control channel data, a minimum scheduling granularity of 8 PRBs may lead to different total limitations of the power emitted by the transmitter.

The average power controller then needs to be able to operate in a manner consistent with the worst case (i.e. lowest power) when using the minimum amount of PRBs. This is because the reference value set for the controller must be achievable in closed loop operation. If the worst case minimum power would be higher than the reference value, the controller would never be able to reach its target, which could result in unstable behavior or in so called integrator windup. Hence the following requirement needs to be met:

$$\langle P_{tot}\rangle^{ref} > \gamma_{low} P_{max,site}$$

However, the controller needs to be able to regulate signals both below and above the reference value. Therefore the reference value needs to be lower than the configured average power limit $\varepsilon P_{max,site}$ where $\varepsilon$ is the fraction of the maximum power of the site, $P_{max,site}$, that is configured by the operator for the site. If the reference value factor is denoted by $0<\mu<1$, it holds that $$\mu \varepsilon P_{max,site} > \gamma_{low} P_{max,site}$$

The resulting lower range limit for the configured average power fraction that can be set therefore becomes $$\varepsilon_{low} = \frac{\gamma_{low}}{\mu}.$$

In current NR implementations this leads to a lower range limit for $\varepsilon$ that is close to 20%, a figure that is considered to be too high for some network service providers.

An aspect of the present invention provides time averaged blanking of slots to enable regulation below $\varepsilon_{low}$. In this respect, "blanking of slots" means that downlink data (e.g. PDSCH) is not scheduled in a blanked slot, although other signaling (such as control data, synchronization signals and reference signals) may be unaffected. For example, in an embodiment in which time averaged blanking over N slots is provided, then the time averaged PDSCH power can be regulated down to a factor of 1/N of the PDSCH power that was the lower range limit based on the minimum schedulable granularity discussed above. This does not automatically mean that also $\varepsilon_{low}$ is multiplied by 1/N since there are both control channel power that is proportional to the PDSCH power, and that are independent of PDSCH, thereby needing treatment as a constant. Using such a model, the following relation may be used to describe the reduction of $\varepsilon_{low}$ $$\varepsilon_{low,1} = a_1 \frac{\gamma_{low}}{\mu} + a_2 \frac{\gamma_{low}}{\mu N}$$

where $a_1$ and $a_2$ are new parameters.

An example algorithm that enables range extension by time-averaged blanking may then operate as follows:

---

Input : $\gamma(t)$
Compute PRBS to schedule:
If $\gamma(t) > \gamma_{low}$ $$n_{PRBs}(t) = n_{granularity} \text{ floor}\left(\frac{\gamma(t) n_{PRBs,total}}{n_{granularity}}\right)$$

$k_{blanking}(t) = N$
Else if $\gamma(t) \leq \gamma_{low}$ $$k_{blanking}(t) = \max\left(1, \text{ floor}\left(\frac{N\gamma(t)}{\gamma_{low}}\right)\right)$$

End

---

For a control step of N slots, PDSCH traffic can be scheduled in a maximum of $n_{PRBs}(t)$ PRBs in at total of $k_{blanking}(t)$ of the N slots of the control step; and no PDSCH traffic can be scheduled in N–$k_{blanking}(t)$ of the N slots of the control step.

In this example, $n_{PRBs}(t)$ is the number of PRBs that are scheduled for a non blanked slot; $n_{PRBs,total}$ is the total number of PDSCH PRBs in one slot, $n_{granularity}$ is the minimum scheduling granularity (i.e. the minimum number of PRBs that may be scheduled in any given slot), and $k_{blanking}(t)$ is the number of slots that are not blanked, out of the N slots of the control step.

Any suitable method may be implemented in the scheduler to determine which particular slots of the control step are blanked.

In other embodiments, the minimum scheduling granularity may selected to be higher or lower than eight (e.g. 16). This would result in an increase of $\gamma_{low}$.

Figure 8:
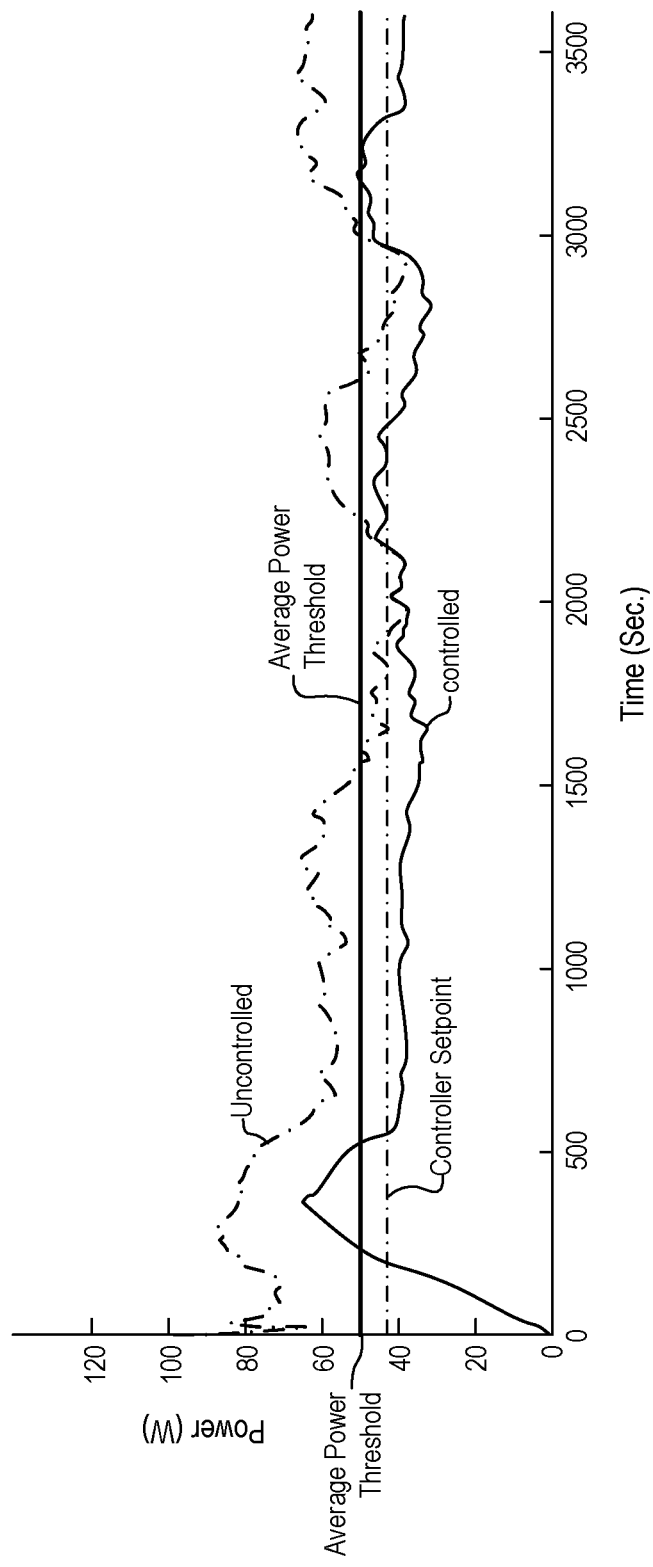
FIG. 8 is a diagram illustrating representative performance of a conventional control system.

The predictive time-averaged power control algorithm described above is motivated by a need to ensure algorithmically that the regulated time-averaged power is always below the average power threshold computed based on the designed RF EMF compliance boundary (exclusion zone) of the transmitter. The PI controller functionality described above does not have this property. This is because linear control, like PD control, is not designed to provide such guarantees. A conventional level-based safety limit does not have this property either, because it only falls back to use a fraction $\gamma_{low}$ of the maximum power in case the regulated average power gets very close to the limit that is not to be exceeded. As may be seen in FIG. 8, there may still be overshoots.

The reason for these overshoots is that when the averaging window for some reason is first filled with very low momentary powers, followed by very high power for say 1.5 minutes, the average power reaches a level close to the limit. During the remaining averaging time up to T there is a nonzero minimum power entering the window (due to control channel signaling, for example) that causes the time averaged power to continue to increase as the low power values in the window are shifted out. Hence an overshoot cannot be prevented, even if zero PDSCH data is transmitted. This is admittedly a rare situation. However, since it can occur in practice it is an expected regulator and operator requirement to implement algorithms that prevent this behavior and ensure that the average power threshold will never be exceeded. Preferably, the algorithm should also have a low computational complexity.

To better understand the solution, a few observations are useful

The momentary powers in the sliding window "now", affect the average power T minutes (such as 6 minutes) ahead in time, Any action taken to avoid overshoot "now", needs to be evaluated for the coming 6 minutes to guarantee that there cannot be an overshoot due to the power contents in the window "now".

In view of these observations, a relevant question to ask, to avoid a limit violation situation is: Given a current time $t_0$, a power profile $P_{tot}(t)$, $t=t_0, \ldots, t_0-(N-1)T_S$ in the sliding window, and a minimum controlled momentary power of $aP_{max,site}$, where $a \in [0,1]$, then what is the maximum possible average power during the coming T seconds (N samples), i.e. for $t=t_0+T_S, \ldots, t_0+NT_S$, provided that regulation at future times is done to limit the power to be less than or equal $aP_{max,site}$?

Provided that a solution to this can be easily computed, overshoot can be avoided by applying the following control strategy:

If any $\langle P_{tot} \rangle (t_0+iT_S) > \varepsilon P_{max,site}-e, i=1, \ldots, N$ then
$\gamma(t) = \gamma_{hardlimit}$ where $\varepsilon P_{max,site}$ is the average power threshold, and where $\gamma_{hardlimit} \in [0,1]$ is the hardlimit fraction of PRBs that can be scheduled, and were e is a pre-configured margin.

The next step is to answer the key question, using a computationally efficient algorithm. Towards that end FIGS. 10A and 10B are useful.

FIG. 10A illustrates a scenario in which the momentary output power (that is, the actual EIRP in each slot) is zero until time $t=t_0-t_s$, at which time it increases step-wise to a level equal to or less than the configured maximum power level of the transmitter ($P_{max,site}$). This power level is maintained constant to the end of the control window at $t=t_0$. As may be seen, between $t=t_0-t_s$ and $t=t_0$, the time average power (calculated over the control window) rises linearly due to the constant momentary power level during this period.

FIG. 10B illustrates prediction of future average power, assuming that at time $t=t_0$ the momentary power level drops to a low level and remains constant. As may be seen in FIG. 10B, the predicted average power continues to rise throughout the future period (i.e. beyond $t=t_0$) due to the non-zero momentary power. As noted above, the power control algorithm must prevent the maximum predicted average power from intersecting the configured average power limit, as shown in FIG. 10A.

As it turns out the most efficient way to compute the average power for future times, is to start by locating the look ahead window to predict a maximum of T ahead in time. In such a situation, there is no contribution from the backward window. Then the windows are moved one sample towards the left, leading to a recursive computation of the sought average power $\langle P_{tot} \rangle (t_0+iT_S)$, $i=1, \ldots, N$.

To outline the details, it follows first that $$\langle P_{tot}(t_0 + NT_S) \rangle = \frac{NaP_{max,site}}{N} = aP_{max,site}.$$

Then for the window positions indexed by $N > i \geq 0$, it follows that $$\langle P_{tot}\rangle(t_0 + iT_S) = \frac{iaP_{max,site} + P_{tot}(t_0) + \cdots + P_{tot}(t_0 + (i-(N-1))T_S)}{N}$$

A trick can now be applied to reduce the computational complexity. Noting that the contribution from the backward window contain the N−i last momentary power samples, for $N > i \geq 0$. This means that the sum of power contributions from the backward window can be recursively computed, by introduction of the backward accumulated power $$P_{backward,i} =$$
$$P_{backward}(t_0 + (i-(N-1))T_S) = P_{tot}(t_0) + \cdots + P_{tot}(t_0 + (i-(N-1))T_S))$$

This quantity can be recursively computed as follows

```
P_backward,N = 0
i = N
While i>2
    i --
    P_backward,i = P_backward,i+1 + P_tot(t_0 + (i - (N - 1))T_S))
End
```

The complete recursive algorithm for evaluation of future average power, together with the computation of the Boolean used to trigger predictive back-off using hard limitation, for all times up to T ahead in time therefore becomes:

```
P_backward,N = 0

⟨P_tot⟩(t_0 + NT_S) = NaP_max,site / N = aP_max,site

MPCtrigger = false
i = N
while i > 2 & ~MPCtrigger
    i --
    P_backward,i = P_backward,i+1 + P_tot(t_0 + (i - (N - 1))T_S))

⟨P_tot⟩(t_0 + iT_S) = (iaP_max,site + P_backward,i) / N

If ( P_tot) (t_0 + iT_S) > εP_max,site − e
        MPCtrigger = true
    End
End
```

Power Back Off Triggering

One way to implement the triggering is:

```
If MPCtrigger = true
    hardlimit = true
end
If MPCtrigger = false
    hardlimit = false
end
```

As is obvious to anyone skilled in the art, still further variants exist.

Figure 11A:
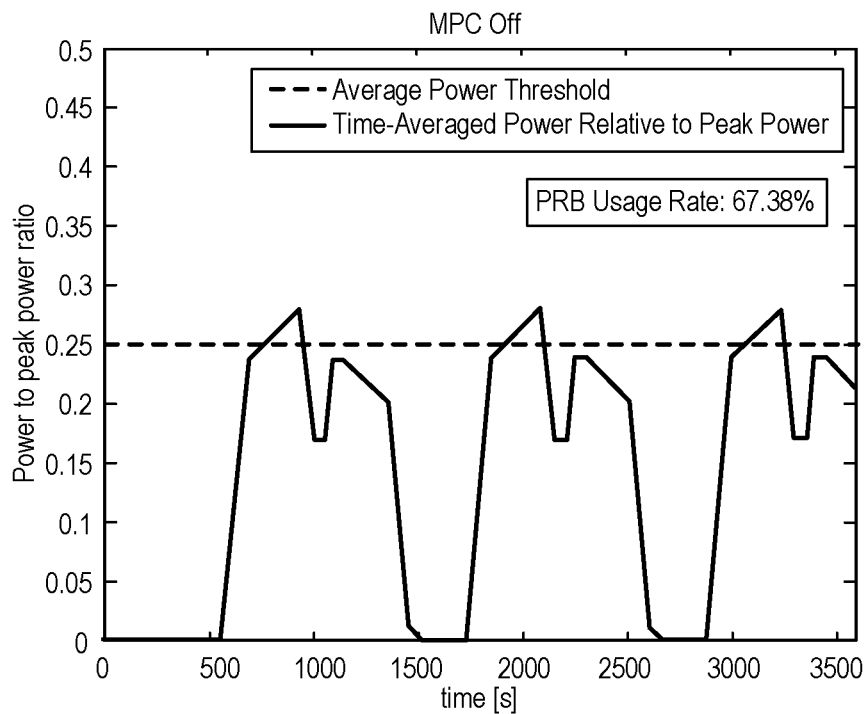
FIGS. 11A and 11B illustrate an example system performance with (FIG. 11A) and without (FIG. 11B) the present invention.
Figure 11B:
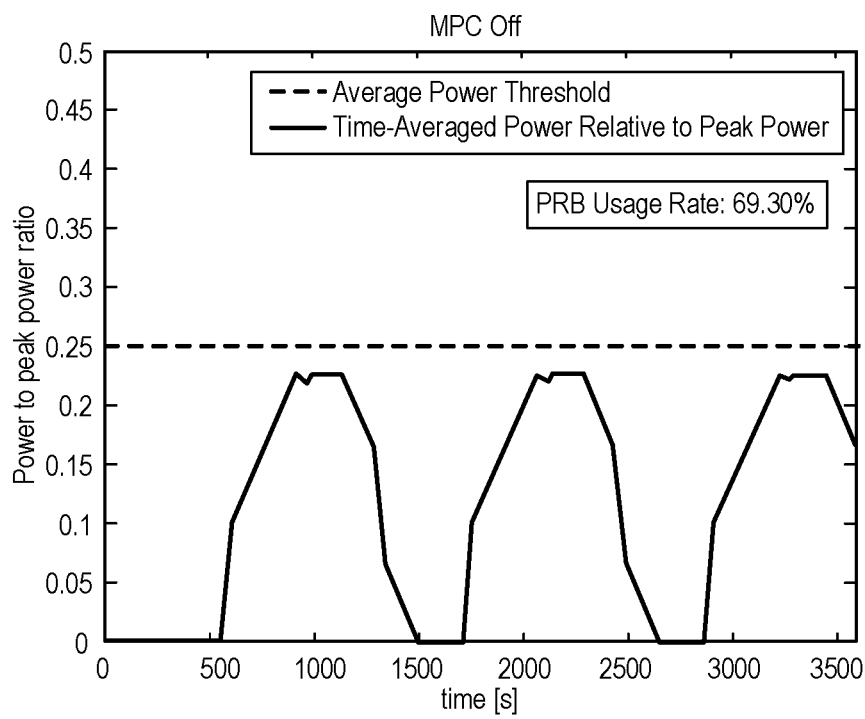

To describe the technical effect of the disclosed invention, and to show its gains, simulations were carried out both without (FIG. 11A) and with (FIG. 11B) Mean Power Control in accordance with embodiments of the present invention. It can be seen that Mean Power Control consistently prevents the overshoots over the EMF power limit seen in FIG. 11A. The PRB usage rate, which influence throughput and capacity, is comparable with and without MPC.

Now, given the advanced safety net above that ensures that the set threshold is never exceeded, it is safe to use a more aggressive reference value setting. This means that the reference value factor it can be increased to a higher value $$\mu_2 > \mu.$$

This results in a further reduced average power (or EIRP) threshold $$\varepsilon_{low,2} = a_1\frac{\gamma_{low}}{\mu_2} + a_2\frac{\gamma_{low}}{\mu_2 N} < \varepsilon_{low,1} = a_1\frac{\gamma_{low}}{\mu} + a_2\frac{\gamma_{low}}{\mu N} = \varepsilon_{low,1} < \varepsilon.$$

While processes in the figures may show a particular order of operations performed by certain embodiments of the present disclosure, it should be understood that such order is representative, and that alternative embodiments may perform the operations in a different order, combine certain operations, overlap certain operations, etc.

Those skilled in the art will recognize improvements and modifications to the embodiments of the present disclosure. All such improvements and modifications are considered within the scope of the concepts disclosed herein.

What is claimed is:

1. A method for controlling a radio transmitter in a wireless network, the method comprising:
   in each one of a plurality of consecutive control steps spanning a predetermined control window, determining (902) a first limit representing a number of physical resource blocks, PRBs, that can be scheduled in each one of a plurality of consecutive future slots of a current control step, based at least in part on an allowable average output power of the radio transmitter, the control window comprising a plurality of control steps, and each control step comprising a plurality of slots;
   when the determined first limit is less than or equal to a pre-configured second limit representing a number of PRBs that can be scheduled in a single slot (904), scheduling (906) PRBs in a proportion of the plurality of consecutive future slots of the current control step, the proportion being calculated such that an averaged fraction of scheduled PRBs in the current control step is less than or equal to the first limit.

2. The method as claimed in claim 1, wherein the first limit comprises a respective first fraction of a total number of PRBs of the wireless network.

3. The method as claimed in claim 2, wherein the second limit comprises a respective second fraction of a total number of PRBs of the wireless network.

4. The method as claimed in claim 1, wherein determining the first limit comprises:
   calculating an allowable average output power of the radio transmitter over a plurality of consecutive future control steps, based at least in part on a profile of the output power of the radio transmitter over a predetermined plurality of past control steps, and future momentary output powers of the radio transmitter that are limited to be equal to or less than a predetermined average output power of the radio transmitter; and
   determining the maximum number of PRBs that can be scheduled based at least in part on the calculated allowable average output power and a predetermined average output power reference value.

5. The method as claimed in claim 4, wherein calculating an allowable average output power of the radio transmitter comprises recursively calculating, for each value of an index i, starting at i=N and decrementing to i=2:

$$P_{backward,i} = P_{backward,i+1} + P_{tot}(t_0 + (i - (N-1))T_S));$$

and $$\langle P_{tot}\rangle(t_0 + iT_S) = \frac{iaP_{max,site} + P_{backward,i}}{N}$$

where:
- $\langle P_{tot}\rangle$ $(t_0+iT_S)$ is the allowable average output power of the radio transmitter in the $i^{th}$ future control step;
- $t_0$ is a time reference of a current control step;
- $T_S$ is a duration of each control step;
- $aP_{max,site}$ is the predetermined average output power of the radio transmitter;
- N is the number of consecutive future control steps; and
- $P_{backward,i}$ is the value of the output power profile in a past control step associated with the $i^{th}$ future control step.

6. The method as claimed in claim 4, wherein the predetermined average output power reference value is ($\varepsilon P_{max,site}$–e), where $\varepsilon$ is a predetermined relative threshold and e is a predetermined margin, and wherein determining the maximum number of PRBs that can be scheduled comprises setting the maximum number of PRBs that can be scheduled in the $i^{th}$ future control step to a hard limit value corresponding to the predetermined average output power reference value, when the allowable average output power of the radio transmitter in the $i^{th}$ future control step is greater than the predetermined average output power reference value.

7. The method as claimed in claim 1, wherein a lower limit of PRBs that can be scheduled in a single slot is an integer multiple of a frequency-domain scheduling granularity.

8. The method as claimed in claim 7, wherein the frequency-domain scheduling granularity is equal to at least two PRBs.

9. The method as claimed in claim 8, wherein the frequency-domain scheduling granularity is equal to eight PRBs.

10. The method as claimed in claim 1, wherein scheduling PRBs in the proportion of the plurality of consecutive future slots comprises:
- scheduling Physical Downlink Shared Channel, PDSCH, in at most $n_{PRBs}(t)$ PRBs in $k_{blanking}(t)$ out of N future slots; and
- scheduling no PDSCH in [N–$k_{blanking}(t)$] of the N future slots;

where:
- $n_{PRBs}(t)$ is the number of PRBs that are scheduled for a non blanked slot;
- $n_{PRBs,total}$ is the total number of PRBs in one slot;
- $n_{granularity}$ is the minimum number of PRBs that may be scheduled in each slot;
- N is the number of future slots; and
- $k_{blanking}(t)$ is the number of slots that are not blanked, out of the N future consecutive slots.

11. The method as claimed in claim 10, wherein the number of slots that are not blanked, out of the N future slots, corresponds with:

$$k_{blanking}(t) = \max\left(1, \text{floor}\left(\frac{N\gamma(t)}{\gamma_{low}}\right)\right)$$

where:
- $\gamma(t)$ is the first limit; and
- $\gamma_{low}$ is the second limit.

12. A network node comprising:
- at least one processor; and
- a non-transitory machine readable storage medium including software instructions configured to control the at least one processor to implement a method of controlling a radio transmitter, the method comprising:
  - in each one of a plurality of consecutive control steps spanning a predetermined time window, determining a first limit representing a number of physical resource blocks, PRBs, that can be scheduled in each one of a plurality of consecutive future slots of a current control step, based at least in part on an allowable average output power of the radio transmitter the control window comprising a plurality of control steps, and each control step comprising a plurality of slots;
  - when the determined first limit is less than or equal to a pre-configured second limit representing a number of PRBs that can be scheduled in a single slot, scheduling PRBs in a proportion of the plurality of consecutive future slots of the current control step, the proportion being calculated such that an averaged fraction of scheduled PRBs in the current control step is less than or equal to the first limit.

13. A non-transitory machine readable storage medium including software instructions configured to control at least one processor to implement a method of controlling a radio transmitter, the method comprising:
- in each one of a plurality of consecutive control steps spanning a predetermined time window, determining a first limit representing a number of physical resource blocks, PRBs, that can be scheduled in each one of a plurality of consecutive future slots of a current control step, based at least in part on an allowable average output power of the radio transmitter the control window comprising a plurality of control steps, and each control step comprising a plurality of slots;
- when the determined first limit is less than or equal to a pre-configured second limit representing a number of PRBs that can be scheduled in a single slot, scheduling PRBs in a proportion of the plurality of consecutive future slots of the current control step, the proportion being calculated such that an averaged fraction of scheduled PRBs in the current control step is less than or equal to the first limit.

* * * * *